United States Patent

[11] 3,625,247

| [72] | Inventors | Theodore A. Dargatz<br>Rockford;<br>Charles F. Leonard, Belvidere, both of Ill. |
|---|---|---|
| [21] | Appl. No. | 869,599 |
| [22] | Filed | Oct. 27, 1969 |
| [45] | Patented | Dec. 7, 1971 |
| [73] | Assignee | Eclipse Fuel Engineering Co.<br>Rockford, Ill. |

[54] PRESSURE REGULATOR WITH PRESSURE RELIEF VALVE
5 Claims, 4 Drawing Figs.

[52] U.S. Cl. .................................. 137/493.2,
137/505.44, 137/505.11
[51] Int. Cl. .......................................... G05d 16/06
[50] Field of Search........................................ 137/493.2,
493.9, 493.6, 493.3, 493, 505.11, 505.36, 505.44,
505.45, 599.2

[56] References Cited
UNITED STATES PATENTS
| 1,514,217 | 11/1924 | Messer | 137/505.45 X |
|---|---|---|---|
| 1,613,743 | 1/1927 | Coberly | 137/505.45 |
| 3,115,154 | 12/1963 | Dillon | 137/505.45 X |
| 3,508,792 | 4/1970 | Bueler | 137/493.6 X |

FOREIGN PATENTS
| 629,206 | 2/1927 | France | 137/599.2 |
|---|---|---|---|

*Primary Examiner*—M. Cary Nelson
*Assistant Examiner*—Robert J. Miller
*Attorney*—Wolfe, Hubbard, Leydig, Voit & Osann, Ltd.

ABSTRACT: A pressure regulator valve having an inlet port for connecting the valve to a high-pressure supply of water and communicating with a passageway which extends into a chamber formed in the valve body, the passageway and the chamber communicating with one another through an opening in one wall of the passageway. The chamber communicates directly with an outlet port for connecting the valve to a service pipe. To block the opening when the pressure in the chamber rises to a predetermined value, a valve element is moved into engagement with the wall of the passageway. A ball-type pressure relief valve is formed directly in the valve element itself to allow water to flow reversely from the chamber to the passageway when the pressure in the chamber rises above the pressure in the passageway.

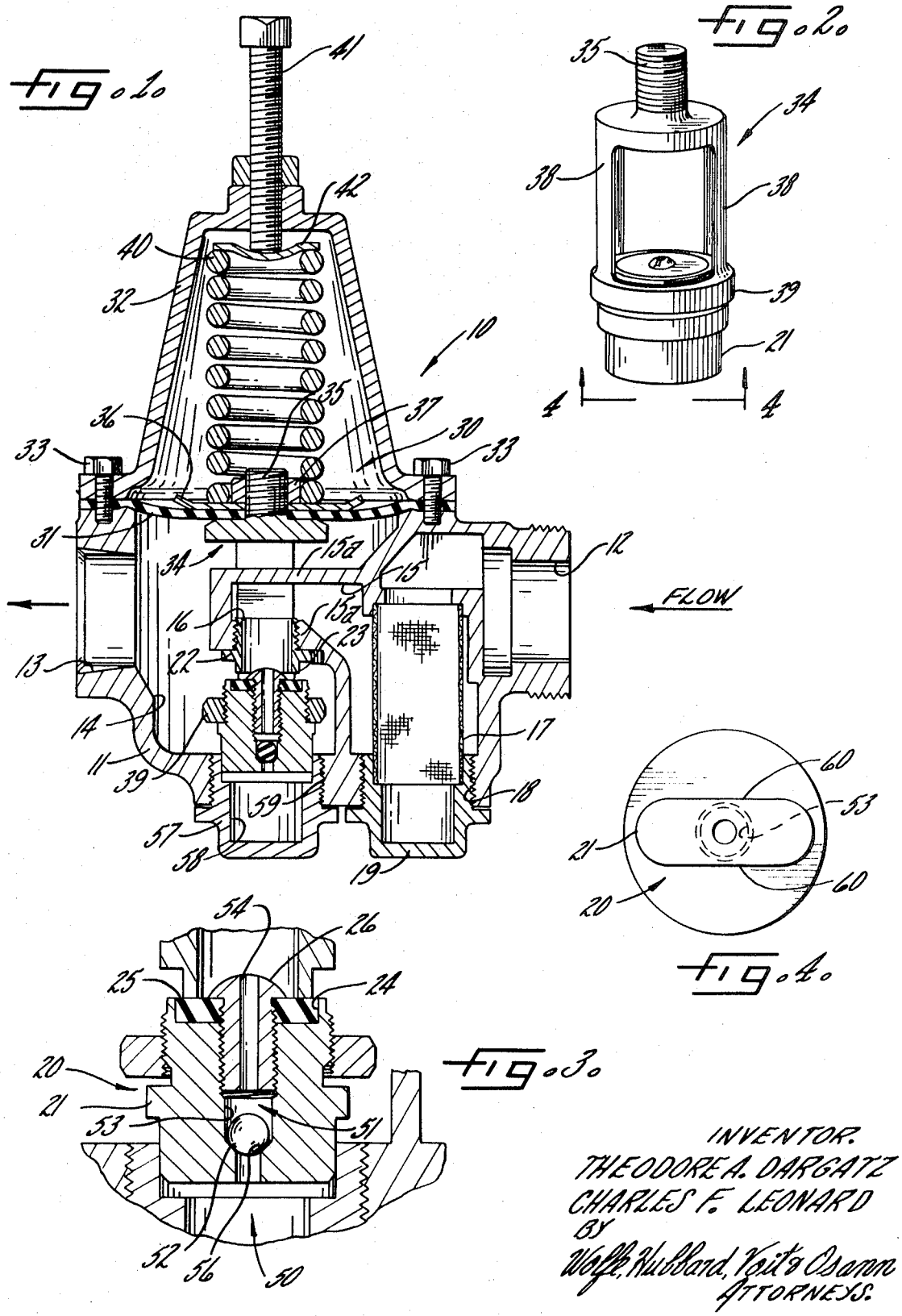

PRESSURE REGULATOR WITH PRESSURE RELIEF VALVE

BACKGROUND OF THE INVENTION

This invention relates to pressure regulator valve positionable in a fluid conduit or pipe to reduce the pressure of the fluid at the outlet of the valve relative to the pressure at the inlet of the valve. A wall within the valve separates the inlet from the outlet, and an opening in the wall establishes communication between the inlet and the outlet. To allow the flow of fluid through the opening or to stop the flow, a valve element is movable between positions in which it unblocks and blocks the opening. In response to changes in the fluid pressure in the outlet, pressure-sensitive mechanism within the valve operates automatically to move the valve element between the positions to normally reduce and keep the pressure in the outlet below that in the inlet. Because this type of valve is commonly used in a system in which pressure might sometimes abnormally build up excessively on the downstream or outlet side of the valve, a pressure relief valve is often built into the pressure regulator valve to allow fluid to flow reversely from the outlet to the inlet when the fluid pressure in the outlet exceeds that in the inlet.

SUMMARY OF THE INVENTION

The primary object of the present invention is to provide a new and improved pressure regulator with a pressure relief valve, the regulator being of simpler and less expensive construction than prior devices of the same general type.

It is a related object to provide a pressure relief valve which may be quickly and easily added to an existing standard pressure regulator of the above general type without a pressure relief valve and to incorporate such a relief valve into the existing pressure regulator without the need of making major changes in the pressure regulator.

It is a more detailed object to accomplish the above by incorporating the relief valve directly in the main valve element itself, and this is achieved by forming the relief valve as a one-way valve which is mounted within the main valve element to allow flow only from the chamber to the passageway and only when the pressure in the chamber is greater than the pressure in the passageway.

Other objects and advantages of the invention will become apparent from the following detailed description when taken in connection with the accompanying drawings.

BRIEF DESCRIPTION OF THE DRAWINGS

FIG. 1 is a cross-sectional view of a pressure regulator valve embodying the novel features of the present invention.

FIG. 2 is an enlarged perspective view of a yoke which is shown in FIG. 1 and which connects the diaphragm to the valve element.

FIG. 3 is an enlarged fragmentary view of the valve element shown in FIG. 1.

FIG. 4 is a cross section taken substantially along the line 4—4 in FIG. 2.

DETAILED DESCRIPTION OF THE PREFERRED EMBODIMENT

As shown in the drawings for purposes of illustration, the invention is embodied in a pressure regulator valve 10 (FIG. 1) for reducing the pressure of a fluid passing in one direction through the valve. In this instance, the valve is for use in a water supply line (not shown) in areas where the supply water pressure is high and must be reduced before the water enters the service line to the service pipe for a building. The valve permits water to flow into the service line until the pressure of the water in the service line reaches a predetermined value at which time the valve closes. As water is removed from the service pipe, the pressure in the service line reduces and the valve opens again.

As shown in FIG. 1, the valve comprises a valve body 11 formed with an inlet port 12 and an outlet port 13 adapted to be connected to the supply line and the service line, respectively. The interior of the valve body is partially hollow to form a chamber 14 which is open at its upper end, the chamber communicating directly with the outlet port. To carry the supply water from the inlet port to the center of the chamber, a passageway 15 formed by walls 15a is connected to the inlet port and communicates with the chamber through a threaded vertical opening 16 formed in the bottom wall of the inner end portion of the passageway. A screen 17 is placed in the passageway to remove foreign particles from the water as the latter passes through the passageway, and an access port 18 is formed in the valve body beneath the screen so that the screen can be removed for cleaning. To close the access port, a threaded cap 19 is screwed into the access port.

To close the opening 16 into the passageway 15 and stop the flow of water through the valve, a valve element 20 (FIG. 3) formed with a generally cylindrical body 21 is positioned within the chamber 14 and is moved upwardly to block the opening when the pressure of the water within the chamber rises to a predetermined value. So that the opening can be blocked with a watertight seal, a tubular fitting 22 (FIG. 1) with a smooth lower end 23 is threaded into the opening to form a seat for the valve element. The upper end portion of the body of the valve element is formed with a circular recess 24 (FIG. 3) which is larger in diameter than the lower end of the fitting, and a washer 25 of resiliently yieldable material is mounted in the recess and is held in place by a screw 26 which extends downwardly through the center of the washer and which is threaded into the body of valve element. When the water pressure in the chamber rises to the predetermined value, the valve element is raised to force the washer against the lower end of the fitting thus blocking the opening to stop the flow of water through the passageway. It will be observed that, when the opening is blocked, the pressure in the passageway is equal to the pressure of the supply water, and the pressure in the chamber is equal to the pressure of the water in the service line.

The valve element 20 is raised and lowered to block and unblock the opening 16 by a spring-biased diaphragm arrangement 30 which is deflected in response to changes in pressure within the chamber 14. As shown in FIG. 1, a circular diaphragm 31 of flexible material, in this instance two sheets of rubber sandwiched around a flat nylon insert, is positioned over the open upper end of the chamber and is clamped in place between the valve body 11 and a generally cone-shaped bonnet 32 which extends upwardly above the valve body. Several screws 33 extend through the bonnet and, the diaphragm and into the valve body to mount the bonnet and the diaphragm on the valve body. The diaphragm is connected to the valve element by a yoke 34 (FIGS. 1 and 2), the upper end portion of the yoke being formed as a screw 35 which extends through the center of the diaphragm. A large washer 36 is telescoped over the screw 35 above the diaphragm, and a nut 37 is threaded onto the screw above the washer to connect the diaphragm to the yoke. As best shown in FIG. 2, the central portion of the yoke is formed with a pair of legs 38 which straddle the wall 15a defining the inner end of the passageway 15, and the lower end portion of the yoke is formed with an internally threaded annulus 39 which is screwed onto a threaded upper end portion of the body 21 of the valve element. Thus, the valve element is connected to the diaphragm for vertical movement therewith. To enable easy access to the valve element, a closure plug 57 (FIG. 1) with a cylindrical socket 58 formed therein is threaded into an opening 59 formed in the bottom of the valve body 11 beneath the valve element. The lower end portion of the body 21 of the valve element is slidably telescoped into the upper end portion of the socket.

To hold the valve element 20 in a position in which the opening 16 in the passageway 15 is unblocked when the pressure of the water in the chamber 14 is below the predetermined pressure, a coiled compression spring 40 (FIG. 1) forming a part of the spring-biased diaphragm 30 is compressed between the bonnet 32 and the washer 36 overlying the diaphragm 31 to urge the diaphragm downwardly and thus force the valve element toward an open or unblocking position. As the water pressure in the chamber rises, the diaphragm is forced upwardly against the force of the spring to lift the yoke 34 and thus the valve element until the washer 25 is forced against the lower end 23 of the fitting 22 thus blocking the opening 16 and stopping the flow of water from the passageway to the chamber, the blocking occurring when the predetermined water pressure is reached. To enable changing of the predetermined pressure at which blocking occurs, a screw 41 extends through the top of the bonnet and bears against a plate 42 positioned on the upper end of the spring, the predetermined pressure being changed by adjusting the screw to vary the extent to which the spring must be compressed before the water pressure becomes effective to raise the valve element to block the opening.

Because a pressure regulator valve 10 of the foregoing type if often used in the service line leading to the service pipes of a building, blocking of the opening 16 creates what is termed a closed system on the downstream side of the valve. In such a closed system, pressure can build up due to normal thermal expansion and for external heating of the water in the service line and service pipes and, to prevent the pressure in the service pipes from building up to a value greater than the pressure of the water in the supply line, the chamber 14 is vented to the passageway 15 when the water pressure in the chamber rises above the water pressure in the passageway.

In accordance with the present invention, a pressure relief valve 50 (FIG. 3) is built directly into the main valve element 20 itself to vent the chamber 14 to the passageway 15 and thus allow water to flow from the chamber to the passageway when the valve element is blocking the opening 16 and the water pressure in the chamber is greater than the water pressure in the passageway. For this purpose, a duct 51 is formed vertically through the valve element, and a one-way valve or check element preferably formed by a ball 52 is positioned within the duct to block the duct until the pressure in the chamber rises above the pressure in the passageway. When the pressure so rises, the ball automatically opens the duct to allow water to flow through the duct from the chamber to the passageway. As a result of being incorporated in the already existing main valve element, the pressure relief valve can be built into a pressure regulator valve 10 of the type shown herein more easily and simply than has been possible heretofore and, at the same time, is more reliable and trouble-free in service use than previous relief valves used for the same general purpose.

Advantageously, the relief valve 50 is built into the valve element 20 by just slightly modifying the valve element and then adding only one additional part, the ball 52. As best shown in FIG. 3, the duct 51 is defined by a hole 53 formed vertically through the center of the body 21 of the valve element and by a hole 54 formed through the center of the screw 26 which mounts the washer 25 on the valve element. For a purpose to be described subsequently, the upper portion of the hole 53 is approximately the same diameter as the screw 26 while the lower portion of the hole 53 and the hole 54 are of reduced diameter. The diameter of the ball is larger than the diameter of the hole 54 and the reduced diameter of the hole 53 but is smaller than the diameter of the upper portion of the hole 53.

In this instance, the ball 52 is placed in the hole 53, and the screw 26 is threaded into the hole 53 thus trapping the ball in the center portion of the duct 51. To prevent the flow of water from the passageway 15 to chamber 14 through the duct when the valve element 20 is blocking the opening 16, the ball rests on a seat 56 formed by the transition in the diameter of the hole 53 between the lower portion of the hole and the upper portion of the hole. The pressure of the water in the passageway forces the ball downwardly against the seat thus keeping the duct blocked under the normal situation in which the water pressure in the passageway is higher than the water pressure in the chamber. When the water pressure in the chamber rises above the water pressure in the passageway, the ball is forced upwardly away from the seat by water from the chamber coming up through the lower portion of the hole 53. To insure that the water in the chamber can flow into the socket 58 and under the valve element for access to the duct, two flats 60 (FIG. 4) are formed on opposite sides of the lower end portion of the body 21 of the valve element. After the ball is pushed off the seat, the water from the chamber flows around the ball and upwardly through the hole 54 in the screw to the passageway thus relieving the pressure in the chamber. When the water pressure in the chamber again falls below that in the passageway, the ball is forced downwardly against the ball seat to block the hole.

It will be observed that it is particularly advantageous to build the relief valve 50 into the valve element 20 itself to relieve the water pressure in the chamber 14 when such pressure rises above the water pressure in the passageway 15. For instance, provision of the relief valve within the valve element greatly enhances the serviceability of the relief valve because access can be easily gained to the relief valve simply by removing the closure plug 57 and unscrewing the body 21 from the annulus 39. Another important advantage of the present invention is that the pressure regulator valve 10 can be provided with a relief valve more easily and less expensively than has been true heretofore since additional walls need not be cast into the valve body 11 to support and mount the relief valve. Additionally, existing pressure regulator valves of the same general type but without a relief valve can be modified to include a relief valve more quickly and easily than previously possible.

We claim as our invention:

1. A pressure regulator valve for regulating the flow of fluid and comprising a valve body having an inlet and outlet, a wall within said body separating said inlet from said outlet and having an opening for establishing communication between the two, a valve element movable between positions blocking and unblocking said opening, and mechanism operable automatically in response to changes in the fluid pressure in said outlet to move said valve element between said positions, the improvement said regulator valve comprising, a relief valve incorporated in said valve element and comprising a hole extending through the valve element and leading from said inlet to said outlet, and means in said hole preventing flow through the latter when the pressure in the inlet is greater than the pressure in the outlet and allowing flow through the hole from the outlet when the pressure in the outlet builds up to a greater value than the pressure in the inlet 2. The valve of claim 1 in which the end portion of said hole communicating with said outlet is of reduced diameter and said means comprises a check member larger than said reduced diameter and slidably positioned within said hole, said check member normally blocking the reduced diameter portion of said hole to block the passage of fluid through said hole, a screw with an axial bore therethrough threaded into the other end portion of the hole to hold said check member in said hole while allowing said check member to move in said hole so that, when the pressure in said outlet is greater than the pressure in said inlet, said check member is moved by the pressure away from the reduced diameter portion of said hole to unblock the hole and allow fluid to pass from the outlet to the inlet 3. A valve as define by claim 2 further including a yieldable sealing washer positioned on said valve element to engage the periphery of said opening when said element is moved into said blocking position, said washer being held on said valve element by said screw.

4. A valve as defined by claim 2 wherein an end portion of said valve element is mounted slidably within a cylindrical socket in said body, and a flat formed on one side of said end portion to allow fluid to flow from said outlet into the socket and through said hole when the pressure in the outlet is greater than the pressure in the inlet.

5. A valve as defined by claim 4 further including a removable plug mounted in the valve body adjacent said valve element to enable easy access to said valve element and said relief valve, said socket being formed within said plug.

* * * * *